United States Patent
Przygodda et al.

(10) Patent No.: US 8,605,554 B2
(45) Date of Patent: Dec. 10, 2013

(54) LASER POWER MANAGEMENT FOR SUPER-RENS OPTICAL RECORDING MEDIA

(75) Inventors: Frank Przygodda, Friedrichshafen (DE); Stephan Knappman, Rottweil (DE); Herbert Hoelzemann, Villingen (DE)

(73) Assignee: Thomson Licensing, Issy les Moulineaux (FR)

( * ) Notice: Subject to any disclaimer, the term of this patent is extended or adjusted under 35 U.S.C. 154(b) by 199 days.

(21) Appl. No.: 12/932,186

(22) Filed: Feb. 18, 2011

(65) Prior Publication Data

US 2011/0249540 A1  Oct. 13, 2011

(30) Foreign Application Priority Data

Apr. 13, 2010 (EP) .................................. 10305383

(51) Int. Cl.
 *G11B 7/007* (2006.01)
 *G11B 7/24* (2006.01)

(52) U.S. Cl.
 USPC .... 369/13.33; 369/275.2; 369/94; 369/30.03; 369/272.1; 430/270.13

(58) Field of Classification Search
 USPC ........... 369/53.21, 47.1, 47.36, 47.38, 275.3, 369/53.43, 59.25, 53.44, 53.37, 53.3, 47.43, 369/275.2, 94, 13.33; 430/270.13
 See application file for complete search history.

(56) References Cited

U.S. PATENT DOCUMENTS

| | | | |
|---|---|---|---|
| 5,448,552 A | 9/1995 | Onagi | |
| 6,469,968 B1 * | 10/2002 | Van Den Enden et al. | 369/59.12 |
| 2004/0190432 A1 * | 9/2004 | Ichihara et al. | 369/275.1 |
| 2005/0007894 A1 * | 1/2005 | Hasegawa | 369/13.33 |
| 2005/0163026 A1 * | 7/2005 | Oshima et al. | 369/275.2 |
| 2007/0274185 A1 | 11/2007 | Kikukawa et al. | |
| 2008/0259754 A1 * | 10/2008 | Nakamura et al. | 369/47.15 |
| 2009/0175155 A1 | 7/2009 | Nakita et al. | |

FOREIGN PATENT DOCUMENTS

| | | |
|---|---|---|
| EP | 0896325 | 2/1999 |
| EP | 1248256 | 10/2002 |
| EP | 1933312 | 6/2008 |
| EP | 2169675 | 3/2010 |
| WO | WO2006098567 | 9/2006 |

* cited by examiner

*Primary Examiner* — Wayne Young
*Assistant Examiner* — Dionne Pendleton
(74) *Attorney, Agent, or Firm* — International IP Law Group, PLLC

(57) ABSTRACT

Methods for operating an apparatus for reading from or writing to a Super-RENS optical recording medium, an apparatus for reading from Super-RENS optical recording media using such methods, and a Super-RENS optical recording medium suitable for such methods are described. The super-RENS optical recording medium has location information that is readable without super-RENS effect. The location information is provided as low-frequency information. For locating a position on the super-RENS optical recording medium, a reading light beam with a power below a power necessary for achieving a super-RENS effect is generated and the location information is retrieved from the super-RENS optical recording medium.

6 Claims, 4 Drawing Sheets

LASER POWER MANAGEMENT FOR SUPER-RENS OPTICAL RECORDING MEDIA

This application claims the benefit, under 35 U.S.C. §119 of EP Patent Application 10305383.1, filed 13 Apr. 2010.

FIELD OF THE INVENTION

The present invention relates to methods for operating an apparatus for reading from and/or writing to a Super-RENS optical recording medium, to an apparatus for reading from Super-RENS optical recording media using such methods, and to a Super-RENS optical recording medium suitable for such methods.

BACKGROUND OF THE INVENTION

Optical data storage is generally limited by the optical resolution of the read/write-system. Straightforward methods of increasing the optical resolution include using a shorter wavelength and a larger numerical aperture NA, at the costs of lens complexity. As an alternative a so-called super-resolution near field structure (Super-RENS) can be placed directly above a data layer of the optical recording medium. The super-RENS technology makes use of an active layer which has the ability to change its optical properties (i.e. the n and k value) in a nonlinear way when the applied laser intensity exceeds a certain threshold. This is caused by a change of physical and/or chemical parameters of the layer material, either due to the light exposure itself or due to a temperature increase caused by the laser beam. With an adequate adjustment of the laser power the region with different optical properties becomes smaller than the laser spot itself, which enables the read-out of pit or mark structures smaller than the diffraction limit. Optical recording media with such an active layer offer the possibility to increase the data density by a factor of 3 to 4 in one dimension compared to a regular optical recording medium. Super-RENS structures formed of a metal oxide or a polymer compound for recording of data and a phase-change layer formed of a GeSbTe or a AgInSbTe (AIST, a compound of silver, indium, antimony, and tellurium) based structure for reproducing of data are known from WO 2005/081242 and US 2004/0257968, respectively. A further example of a super-RENS structure is described in WO 2004/032123. Unfortunately, such materials suffer from degradation, which increases with the number of read-out cycles. This results in a reduced efficiency of the super-RENS effect and, therefore, a lower performance of the system. In case of a excessive degradation the read-out of the optical recording medium can fail completely.

SUMMARY OF THE INVENTION

It is an object of the invention to propose solutions for navigating on a super-RENS optical recording medium and for operating an apparatus for reading from and/or writing to a Super-RENS optical recording medium, which avoid degradation of the super-RENS optical recording medium.

According to a first aspect of the invention, this object is achieved by a method for operating an apparatus for reading from and/or writing to super-RENS optical recording media, which has the steps of:
  generating a light beam with a power below a power necessary for achieving a super-RENS effect;
  performing focusing and tracking on a super-RENS optical recording medium with the light beam; and
  increasing the power of the light beam above the power necessary for achieving a super-RENS effect for reading from and/or writing to the super-RENS optical recording medium (10).

Accordingly, an apparatus for reading from a super-RENS optical recording medium, with a light source for generating a light beam, is adapted to generate a light beam with a power below a power necessary for achieving a super-RENS effect, to perform focusing and tracking on a super-RENS optical recording medium with the light beam; and to increase the power of the light beam above the power necessary for achieving a super-RENS effect for reading from and/or writing to the super-RENS optical recording medium.

The pause mode of current conventional drives, e.g. for CD (Compact Disc), DVD (Digital Versatile Disc), or BD (Blu-Ray Disc) is realized by a track jump after each revolution of the optical recording medium. At the same time the drive operates like in the normal playback mode with full read-out laser power. For a super-RENS optical recording medium this would mean that the actual track is read out again and again. This leads to an accelerated degradation of the active layer material at this track. To avoid this, according to one aspect of the invention the laser power is reduced to a level below the threshold of the active layer and below a threshold of degradation. The remaining power just needs to be sufficient to ensure focusing and tracking, e.g. using a guide structure of groves and lands or the long pits recorded in the tracks that are detectable without super-RENS effect. As a result, the laser beam is still on track when the drive returns to the playback mode or the recording mode. The laser power is then increased to the necessary level for super-RENS read-out or super-RENS recording and playback or recording continues.

According to a further aspect of the invention, the above object is achieved by a super-RENS optical recording medium with a super-RENS data area, which has location information that is readable without super-RENS effect in the super-RENS data area.

Accordingly, a first method for locating a position on a super-RENS optical recording medium with a super-RENS data area has the steps of:
  generating a reading light beam with a power below a power necessary for achieving a super-RENS effect; and
  retrieving location information from the super-RENS data area, which is readable without super-RENS effect, with the reading light beam.

Similarly, an apparatus for reading from a super-RENS optical recording medium with a super-RENS data area, with a light source for generating a reading light beam, is adapted to operate the light source with a power below a power necessary for achieving a super-RENS effect, and to retrieve location information from the super-RENS data area, which is readable without super-RENS effect.

Alternatively, the location information that is readable without super-RENS effect is provided by a look-up table with fingerprints of tracks of the super-RENS optical recording medium.

In this case a method for locating a position on a super-RENS optical recording medium has the steps of:
  generating a reading light beam with a power below a power necessary for achieving a super-RENS effect; and
  retrieving location information from the super-RENS optical recording medium, which is readable without super-RENS effect, by comparing a read-out signal obtained with the reading light beam with fingerprints of tracks of the super-RENS optical recording medium.

Similarly, an apparatus for reading from a super-RENS optical recording medium, with a light source for generating a reading light beam, is adapted to generate a reading light beam with a power below a power necessary for achieving a super-RENS effect, and to retrieve location information from the super-RENS optical recording medium, which is readable without super-RENS effect, by comparing a read-out signal obtained with the reading light beam with fingerprints of tracks of the super-RENS optical recording medium using a comparator.

If the read-out of a certain part of the optical recording medium is desired the pickup has to find the corresponding track. Address information on the optical recording medium is usually used for navigation. One idea of the present invention is to provide the super-RENS optical recording medium with location information that is readable without super-RENS effect. In this case the laser power can be controlled in such way that the laser intensity stays below the super-RENS threshold during special operation modes, e.g. during a search mode. As a result no change of the optical and physical properties of the material takes place and the mask layer is prevented from a further degradation because less heat is transferred to the layer stack. This improves the long term stability of the layer stack. Even for super-RENS optical recording media with an improved read stability the operation at low power is preferable, because in any case a high read power and the related temperature increase in the medium may cause local structure changes of the materials in the nanometer scale. The idea is applicable to read-only, write-once and rewriteable super-RENS formats. It is in particular interesting for formats similar to DVD-RAM, which require a lot of search operations, e.g. to read out fragmented data files.

Preferably, the location information is provided by marks arranged in defined positions on the super-RENS optical recording medium, which are detectable without super-RENS effect. Advantageously, the marks are located in linking frames.

The marks are formed by pit patterns representing low-frequency information, which can be read out without the super-RENS effect. These pit patterns are preferably arranged in linking frames, as the content of the linking frame can be freely defined. It does not need to follow the modulation rules which are used for the user data, as the complete linking frame is normally removed from the detected signal before demodulation.

Alternatively, the location information is provided by a look-up table with fingerprints of tracks of the super-RENS optical recording medium.

This solution has the advantage that no special low-frequency address information is required in the data area of the super-RENS optical recording medium, which occupies more space than address information which makes use of the full bandwidth.

Instead, the low-frequency component of the full information, i.e. of the channel bit data stream, is used for navigation. Even if it does not contain the full information, the low-frequency component is generally different from track to track. This fact is used for navigation. For this purpose comparing a read-out signal retrieved from the super-RENS optical recording medium is compared with the fingerprints of the tracks to determine the current position on the super-RENS optical recording medium.

Advantageously, the look-up table contains fingerprints of parts of the tracks or of selected tracks. This allows to reduce the amount of data that needs to be stored in the look-up table.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

In the following the basic idea of the invention is explained based on a data structure similar to the data structure used for BluRay discs. Of course, the invention is also applicable to other types of data structures.

Figure 1:
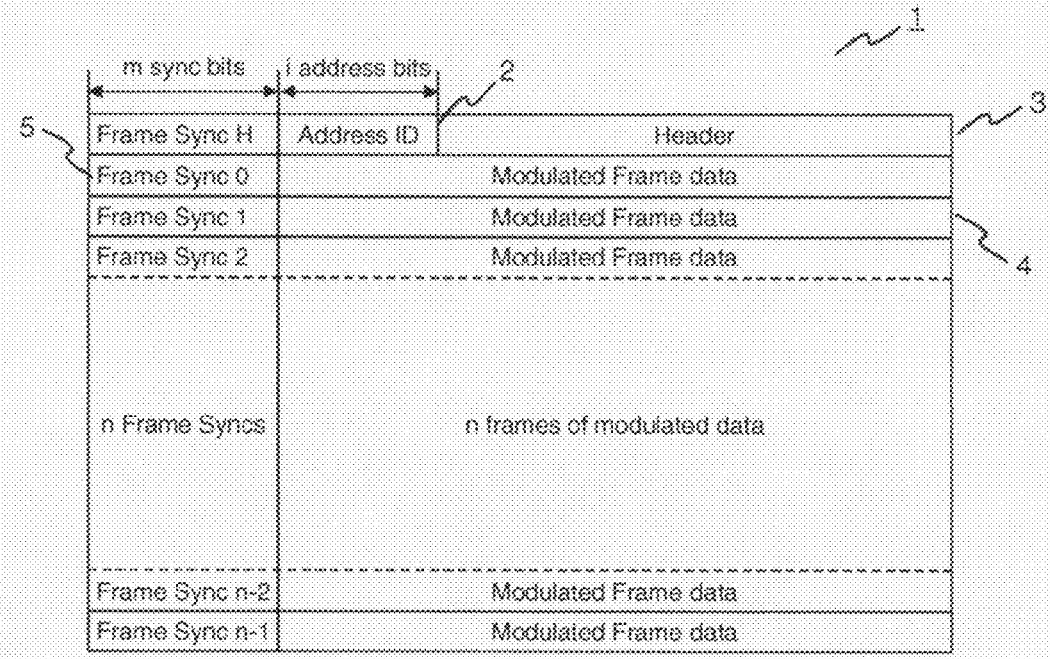
FIG. 1 shows an example of a physical cluster.

FIG. 1 shows an example of a physical cluster 1. In general the modulated data are organized in a matrix of n frames 4 with k channel bits each. Each frame 4 is completed by a special sync pattern 5 in a Frame Sync 5 with m sync bits, which violates the modulation rules and can thus easily be detected. For example, for BluRay discs a 9T/9T pattern is used for the sync patterns. Each physical cluster 1 is linked to a neighboring physical cluster by a so called linking frame 3 having the same size as a normal frame 4. This linking frame 3 also has a Frame Sync 5 for detection. The content of the linking frame 3 can be freely defined and does not need to follow the modulation rules which are used for the user data, as the complete linking frame 3 is normally removed from the detected signal before demodulation.

According to a first aspect of the invention, in order to enable a low-power search mode a unique address ID 2 is inserted in the linking frame 3. The i address bits of the address ID 2 are built up or modulated only with runlengths above the diffraction limit of the employed optical system. For example, only runlengths larger than 4T are allowed. Consequently, this address information can be reliably read even in a low power mode, in which no super-RENS effect is achieved. A physical cluster 1 is then found by searching for the linking frame 3 and decoding the corresponding address ID 2. Preferably, the size of a physical cluster 1 is defined such that at least one physical cluster 1 and, consequently, one linking frame 3 is present per track, which is typically the case. For reasons of robustness the address ID 2 is advantageously protected by an error correction code.

The above described solution for a low-power search mode requires special low-frequency address information 2. This information occupies more space on an optical recording medium than address information which makes use of the full bandwidth. In the following a solution for a low-power search mode according to a further aspect of the invention shall be explained. This solution does not require special address information. The complete information is stored with the full bandwidth on the optical recording medium.

Figure 2:
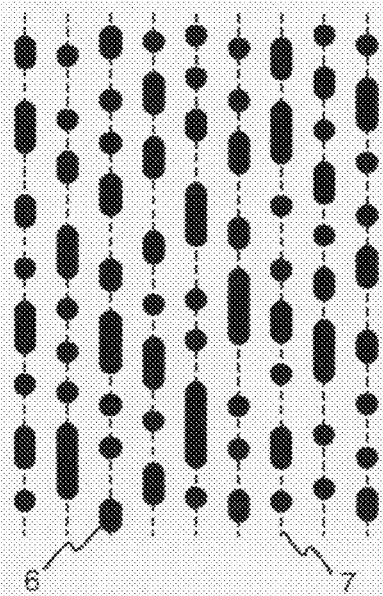
FIG. 2 illustrates a random 2T to 8T pit structure.

FIG. 2 shows a structure of pits 6 of a pre-recorded optical recording medium, which are intended to be read-out with super-resolution, and correspondingly with a high bandwidth. The pits 6 are arranged in tracks 7. In the present example it is assumed that the pits 6 with channel bit lengths of 2T, 3T and 4T are smaller than or equal to the diffraction limit, whereas the pits 6 with channel bit lengths of 5T, 6T etc. are larger than the diffraction limit. Hence, the 2T, 3T and 4T pits are only detectable with super-resolution, while the larger pits are also detectable at low laser power without super-resolution.

Figure 3:
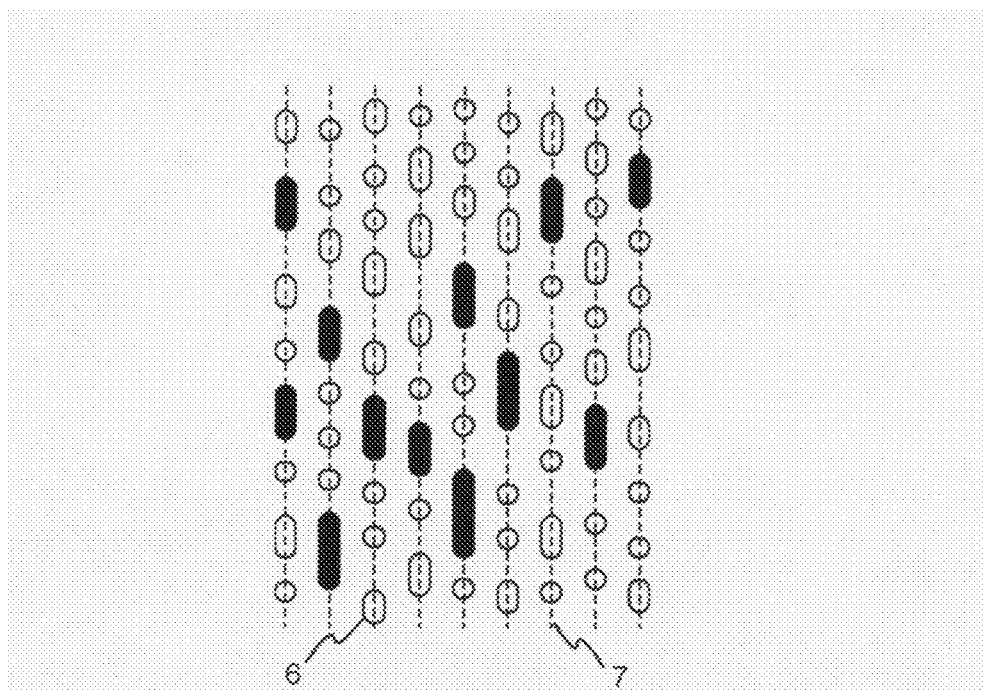
FIG. 3 depicts those pits of the pit structure of FIG. 2 with a length above the diffraction limit.

FIG. 3 shows those pits 6 of the pit structure of FIG. 2 with lengths above the diffraction limit, which can be detected at low power without super-resolution. Apparently the land areas between the pits 6, which are longer than the diffraction limit, can also be detected. This is, however, not shown in FIG. 3 for the sake of simplicity. Furthermore, consecutive short runlengths (e.g. 2T/2T/2T) will be detected as one long runlength (e.g. 6T).

Figure 4:
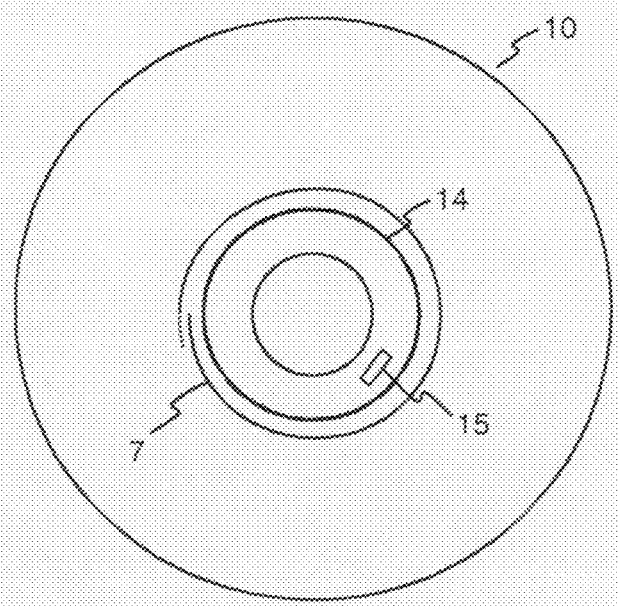
FIG. 4 shows a Super-RENS optical recording medium according to one embodiment of the invention.

The further solution now makes use of the low-frequency component of the full information, i.e. of the channel bit data stream. Even if it does not contain the full information, the low-frequency component will generally be different from track to track. This fact is used for navigation. A table stored on the optical recording medium, e.g. in the lead-in area, provides the information about the low-frequency properties of each track 7 or of a number of selected tracks 7 at preferably equidistant radial positions. In the following this information is denoted by the term "low-frequency fingerprint". FIG. 4 schematically illustrates such an optical recording medium 10. Located in the lead-in area 14 is a table 15 with the low-frequency fingerprints of the tracks 7.

To find a certain track 7 the drive reads the tracks 7 with a reduced laser power and compares the obtained information with the stored fingerprints retrieved from the table 15. Using the information from the table 15 the drive is able to recognize the actual location of the pickup and to find the desired track 7.

In order to save storage capacity in the lead-in area 14 of the optical recording medium 10 the information about the fingerprints is advantageously further filtered with a low-pass filter and stored in a compressed format. For a further reduction of the size of the table 15 it is possible to store only the fingerprints of a part of each track 7 or of each n-th track 7. The latter approach still allows for at least a rough navigation on the optical recording medium 10. For example, if the track pitch is about 250 nm and the information area starts at a radius R=24 mm and ends at a radius R=59 mm, there are about 140000 tracks. Assuming that each $10^{th}$ track 7 is used for the fingerprint information, 14000 tracks need to be distinguished. The length of the fingerprint sequence is selected long enough to obtain individual patterns for each track 7.

As indicated before, the information content of the long pit and land symbols is used to create the fingerprints. In the following the creation of the fingerprints shall be explained in more detail. The signal which is detected at low laser power is low-pass filtered by the cut-off frequency and has the same modulation as the corresponding super-resolution signal. However, for all areas of the optical recording medium 10 where only pits and land areas below the diffraction limit are present the low-pass filtered signal will be on a level between the maximum signal amplitude (on land) and the minimum signal amplitude (on pit). This signal curve is taken into account for the detection of the long pits and lands.

The detection of the long pits and land symbols is preferably realized with a modified PRML algorithm. The modification concerns the PR-target function, considering the different low-pass characteristics of the signal when read without the super-resolution.

After determination of the low-pass channel bit data stream the fingerprint information of the relevant tracks 7 is stored in the lead-in area 14 of the optical recording medium 10 together with information about the position on the optical recording medium 10.

When the drive operates in search mode, the signal read without super-resolution is processed with the same PRML parameters as those used for creating the fingerprints. The resulting low-pass channel bit data stream is then compared with the fingerprint information in the lead-in area 14 to determine the actual position on the optical recording medium 10. However, because of the absence of small pit and land symbols in the low-pass channel bit data stream the use of the standard error correction coding (ECC) will fail. Therefore, an exact matching of actual read-out signal with the stored fingerprints might not always be assured.

Figure 5:
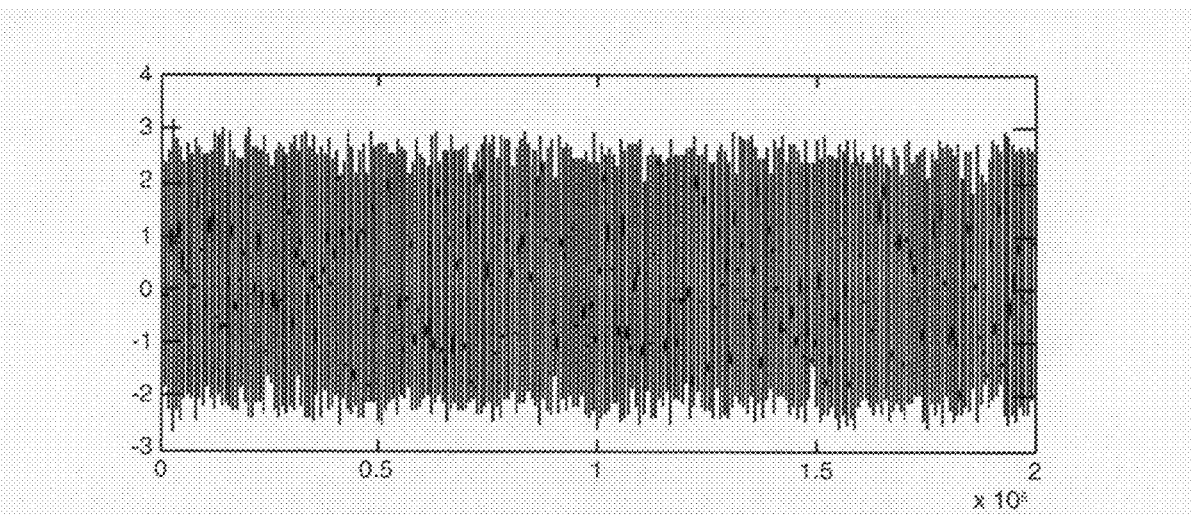
FIG. 5 illustrates an exemplary read-out signal read without super-resolution.
Figure 6:
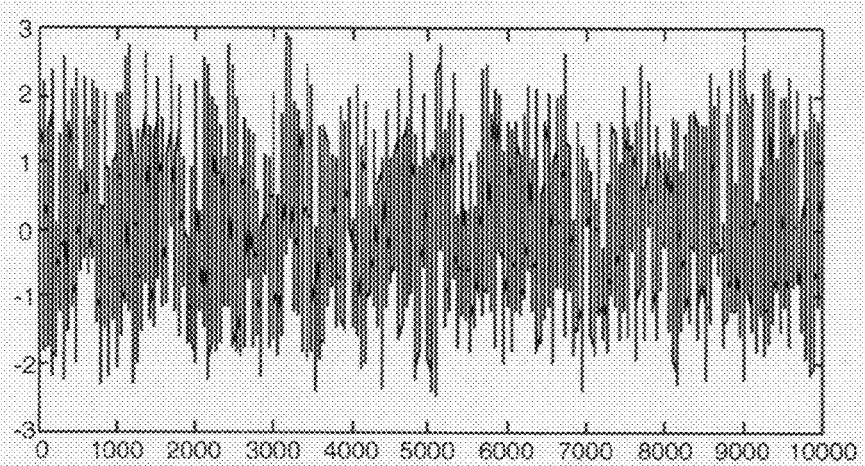
FIG. 6 shows an extracted part of the read-out signal of FIG. 5.
Figure 7:
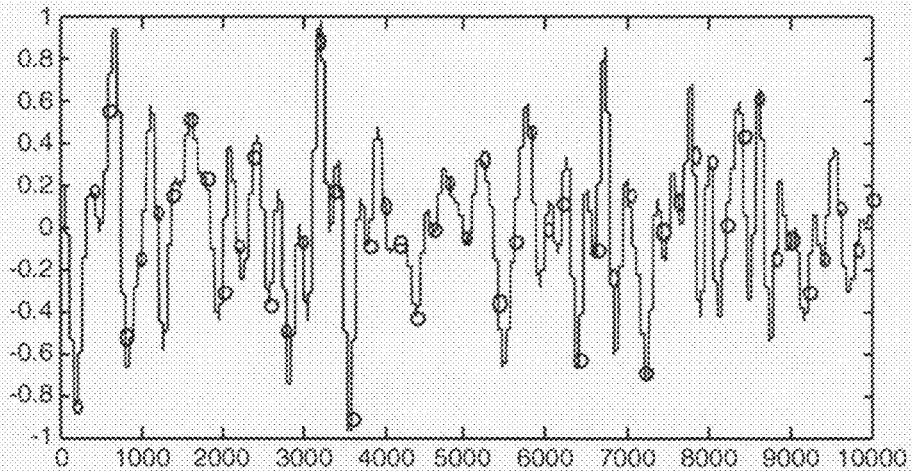
FIG. 7 depicts sample points determined from the low-pass filtered extracted part.

To overcome this problem a more robust method for identifying a certain fingerprint based on a correlation algorithm is preferably used. Here, the fingerprints stored in the lead-in area 14 of the optical recording medium 10 consist of low-pass filtered and sampled parts of the signal of each track 7 or of selected tracks 7, e.g. each n-th track 7. The creation of the sample values is illustrated in FIGS. 5 to 7, where FIG. 5 shows the read-out signal read without super-resolution, FIG. 6 depicts an extracted part of the signal of this read-out signal, and FIG. 7 shows this extracted part after low-pass filtering and selection of sample points, which are indicated by the circles. The size of the parts, the cut-off frequency of the low-pass filter, and the number of samples is chosen such that a reliable identification of the parts is ensured. The resulting sample values are stored in the lead-in area 14 of the optical recording medium 10 together with the information about the position of the part on the optical recording medium 10, e.g. in the form of a track number.

Figure 8:
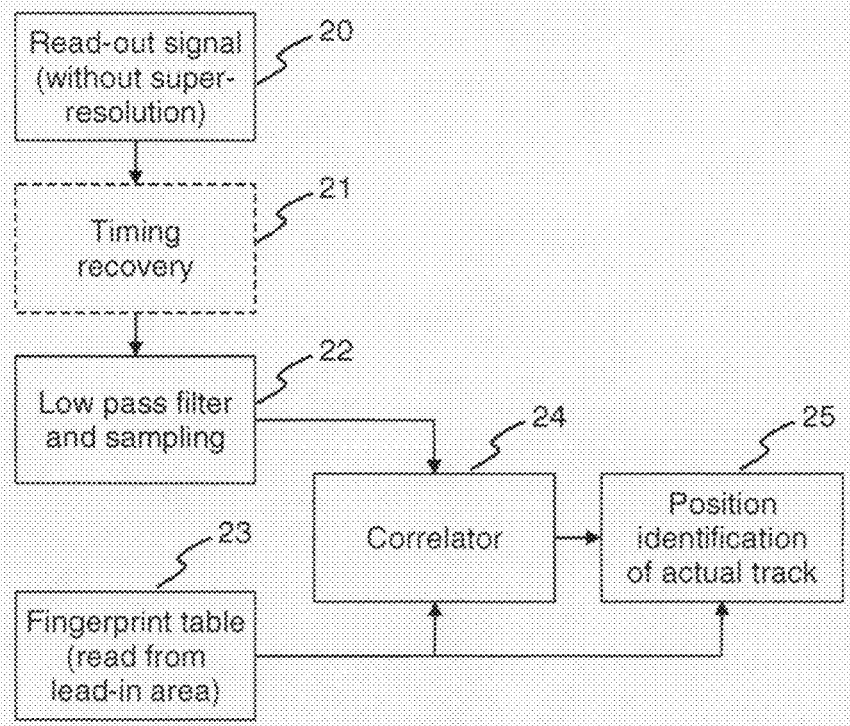
FIG. 8 shows a block diagram of an implementation of the advanced search mode using a correlation algorithm.

A block diagram of an implementation of the search mode using a correlation algorithm is illustrated in FIG. 8. When the drive operates in search mode a read-out signal without the super-RENS effect is obtained 20. After an optional timing recovery 21 this signal is low-pass filtered and sampled 22 with the same parameters as the reference signals stored in the fingerprint table. The sample values are then fed to a correlation unit 24. This unit 24 determines the degree of correlation of the sample values and the values of each fingerprint, which are retrieved 23 from the fingerprint table. If the degree of correlation exceeds a certain level, the fingerprint corresponding to the read-out signal is identified. By means of the information about the position of the fingerprint the actual position on the optical recording medium 10 is determined 25.

The low-pass filtering of the signals is preferably performed digitally after a timing recovery 21. This ensures that the read-out signal is sampled at well defined positions, which ensures the correspondence of the sample points with the sample point signals of the stored fingerprint. This in turn improves the performance of the correlation.

To avoid unnecessary processing of the signals it is advantageous to perform the correlation only at defined positions of the track. These positions are preferably indicated by synchronization marks readable without the super-RENS effect. Of course, in this case the stored fingerprints need to correspond to those positions.

What is claimed is:

1. A super-RENS optical recording medium, the super-RENS optical recording medium comprising a data area with tracks comprising prerecorded data, which make use of a full bandwidth of the super-RENS optical recording medium, wherein the super-RENS optical recording medium further comprises a look-up table with fingerprints of tracks of the super-RENS optical recording medium, wherein the look-up table is readable without super-RENS effect, and wherein the fingerprint of a given track is a low-frequency component of the prerecorded data, wherein a low-frequency bandwidth is a range of frequencies which can be read out without the super-RENS effect.

2. The super-RENS optical recording medium according to claim 1, wherein the look-up table contains fingerprints of parts of the tracks or of selected tracks.

3. A method for determining a position on a super-RENS optical recording medium, the super-RENS optical recording medium comprising a data area with tracks comprising prerecorded data, which make use of a full bandwidth of the super-RENS optical recording medium, and a look-up table with fingerprints of tracks of the super-RENS optical recording medium, which is readable without super-RENS effect, wherein the fingerprint of a given track is a low-frequency component of the prerecorded data in the track, wherein a low-frequency bandwidth is a range of frequencies which can be read out without the super-RENS effect, the method comprising the steps of:
- generating a reading light beam with a power below a power necessary for achieving a super-RENS effect;
- retrieving the look-up table with fingerprints of tracks of the super-RENS optical recording medium which is readable without super-RENS effect; and
- comparing a read-out signal of data of a track of the data area obtained with the reading light beam with the fingerprints of tracks of the super-RENS optical recording medium so as to determine a position of said track.

4. The method according to claim 3, wherein the step of comparing the read-out signal with the fingerprints of tracks of the super-RENS optical recording medium includes correlating samples of the read-out signal with the fingerprints.

5. An apparatus for reading from a super-RENS optical recording medium, the super-RENS optical recording medium comprising a data area with tracks comprising prerecorded data, which make use of a full bandwidth of the super-RENS optical recording medium, and a look-up table with fingerprints of tracks of the super-RENS optical recording medium, which is readable without super-RENS effect, wherein the fingerprint of a given track is a low-frequency component of the prerecorded data in the track, wherein a low-frequency bandwidth is a range of frequencies which can be read out without the super-RENS effect, wherein the apparatus is configured to:
- generate a reading light beam with a light source, the reading light beam having a power below a power necessary for achieving a super-RENS effect so as to read data of a track of the data area and to retrieve the look-up table with fingerprints of tracks of the super-RENS optical recording medium, which is readable without super-RENS effect; and
- determine a position of said track by comparing the read-out signal obtained with the reading light beam with the fingerprints of tracks of the super-RENS optical recording medium using a comparator.

6. The apparatus according to claim 5, wherein the comparator has a correlator for correlating samples of the read-out signal with the fingerprints.

* * * * *